United States Patent
Li et al.

(10) Patent No.: US 10,536,284 B2
(45) Date of Patent: Jan. 14, 2020

(54) DATA TRANSMISSION METHOD AND APPARATUS

(71) Applicant: Huawei Technologies Co., Ltd., Shenzhen, Guangdong (CN)

(72) Inventors: Zhiming Li, Reading (GB); Longyu Cao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 15/632,136

(22) Filed: Jun. 23, 2017

(65) Prior Publication Data

US 2017/0295029 A1 Oct. 12, 2017

Related U.S. Application Data

(63) Continuation of application No. PCT/CN2014/095116, filed on Dec. 26, 2014.

(51) Int. Cl.

| | | |
|---|---|---|
| *H04N 7/173* | (2011.01) | |
| *H04L 12/18* | (2006.01) | |
| *H04W 56/00* | (2009.01) | |
| *G08B 25/08* | (2006.01) | |
| *H04N 7/16* | (2011.01) | |
| *H04N 7/167* | (2011.01) | |
| *H04N 21/234* | (2011.01) | |
| *H04N 21/235* | (2011.01) | |
| *H04W 4/12* | (2009.01) | |

(Continued)

(52) U.S. Cl.
CPC ............ *H04L 12/18* (2013.01); *G08B 25/085* (2013.01); *H04N 7/163* (2013.01); *H04N 7/165* (2013.01); *H04N 7/1675* (2013.01); *H04N 21/235* (2013.01); *H04N 21/23412* (2013.01); *H04W 4/12* (2013.01); *H04W 56/00* (2013.01); *H04W 84/02* (2013.01); *H04W 4/06* (2013.01)

(58) Field of Classification Search
CPC ....................................................... H04L 65/80
See application file for complete search history.

(56) References Cited

U.S. PATENT DOCUMENTS

| | | | | |
|---|---|---|---|---|
| 2004/0128701 A1* | 7/2004 | Kaneko | .............. | H04N 7/17318 725/136 |
| 2015/0030022 A1* | 1/2015 | Mantin | .................. | H04L 65/80 370/390 |

FOREIGN PATENT DOCUMENTS

| | | |
|---|---|---|
| CN | 101415211 A | 4/2009 |
| CN | 101790188 A | 7/2010 |

(Continued)

OTHER PUBLICATIONS

Schulzrinne et al., "RTP: A Transport Protocol for Real-Time Applications", The Internet Society, Network Working Group, Request for Comments 1889, Jan. 1996, 75 pages.

(Continued)

*Primary Examiner* — Olugbenga O Idowu

(57) ABSTRACT

The present disclosure discloses a data transmission method and apparatus. User equipment (UE) measures and transmits a transmission delay to a group communication service application server (GCS AS), or the GCS AS itself determines a transmission delay, so that the GCS AS may determine, according to the transmission delay, a time of sending a packet on a multicast path or a unicast path. Therefore, a problem of out of order of packets or a loss of a packet due to a transmission delay is resolved, and continuity of a communication service is maintained.

10 Claims, 5 Drawing Sheets

---

UE measures a transmission delay according to a sequence number of a packet — 401

The UE sends the transmission delay to a group communication service application server GCS AS, so that the GCS AS determines, according to the transmission delay, a time of sending a packet on a multicast path or a unicast path — 402

(51) Int. Cl.
*H04W 84/02* (2009.01)
*H04W 4/06* (2009.01)

(56) References Cited

FOREIGN PATENT DOCUMENTS

| | | |
|---|---|---|
| CN | 101883329 A | 11/2010 |
| CN | 102572706 A | 7/2012 |
| EP | 1367848 A1 | 12/2003 |
| EP | 2391159 A1 | 11/2011 |
| EP | 2509320 A1 | 10/2012 |
| WO | 2008155713 A2 | 12/2008 |
| WO | 2014183279 A1 | 11/2014 |

OTHER PUBLICATIONS

Schulzrinne et al., "Real Time Streaming Protocol (RTSP)", The Internet Society, Network Working Group, Request for Comments 2326, Apr. 1998, 92 pages.

* cited by examiner

DATA TRANSMISSION METHOD AND APPARATUS

CROSS-REFERENCE TO RELATED APPLICATIONS

This application is a continuation of International Application No. PCT/CN2014/095116, filed on Dec. 26, 2014, the disclosure of which is hereby incorporated by reference in its entirety.

TECHNICAL FIELD

Embodiments of the present disclosure relate to the communications field, and more specifically, to a data transmission method and apparatus.

BACKGROUND

A group communications technology is a communications technology that has a scheduling capability, and may provide a unidirectional call capability, to allow user equipment (UE) to communicate with one or more other users. As mobile services become increasingly rich, a text, an image, a video, and the like become content of group communication. A conventional group communications technology can no longer satisfy a communication requirement. Currently, development of a Long Term Evolution (LTE) technology makes implementation of rich group services on a public LTE network possible. Group communication in the LTE technology may perform information transmission in a unicast manner and a multicast manner. In the multicast transmission manner of the group communication, information transmission is performed by using an existing multimedia broadcast/multicast service (MBMS) technology.

In the prior art, if UE 1 needs to send data to UE 2, UE 1 sends the data to a group communication service application server (GCS AS) by using a unicast bearer. The GCS AS determines to send the data to UE 2 in a multicast manner or a unicast manner. Specifically, the GCS AS transmits data based on the Real-Time Transport Control Protocol (RTP), that is, transmits, in a form of multiple RTP packets, the data sent by UE 1 to UE 2. Currently, a delay from a time at which the GCS AS starts sending the first RTP packet to a time at which UE 2 receives, by means of unicast, the first RTP packet sent by the GCS AS is 40 ms, that is, a transmission delay of unicast transmission is 40 ms. A delay from a time at which the GCS AS starts sending the first RTP packet to a time at which UE 2 receives, by means of unicast, the first RTP packet sent by the GCS AS is 160 ms, that is, a transmission delay of multicast transmission is 160 ms.

In a moving process of UE 2, a transmission manner in which the GCS AS sends data to UE 2 is switched, that is, when UE 2 moves from a non-MBMS coverage area to an MBMS coverage area, the transmission manner is switched from unicast to multicast; when UE 2 moves from the MBMS coverage area to the non-MBMS coverage area, the transmission manner is switched from multicast to unicast.

As shown in FIG. 1, UE 2 moves from the non-MBMS coverage area to the MBMS coverage area, and UE 2 is switched from unicast to multicast. It is assumed that switching occurs at a moment t0. In this case, seven RTP packets have been transmitted on a unicast path, while the first RTP packet has just been transmitted on a multicast path. If in this case, UE 2 is switched from unicast to multicast, UE 2 receives RIP packets on the multicast path according to a sequence of sending the RTP packets on the multicast path. UE 2 repeatedly receives, on the multicast path, RTP packets whose sequence numbers are 2 to 7 and that have been received on the unicast path (for example, UE 2 may discard these repeatedly received packets, because these packets have been received on the unicast path before switching). Therefore, in a processing of switching from unicast to multicast, UE 2 repeatedly receives some RTP packets.

As shown in FIG. 1, UE 2 moves from the MBMS coverage area to the non-MBMS coverage area, and UE 2 is switched from multicast to unicast. It is assumed that switching occurs at the moment t0. In this case, only one RTP packet is transmitted on the multicast path, while seven RTP packets have been transmitted on the unicast path. If in this case, UE 2 is switched from multicast to unicast, UE 2 receives RTP packets on the unicast path according to a sequence of sending the RTP packets on the unicast path. Therefore, for the packets whose sequence numbers are 2 to 7, UE 2 does not receive these packets after being switched to unicast, and can only start receiving, according to a unicast data sending sequence, packets from a packet whose sequence number is 8. Therefore, in a process of being switched from multicast to unicast, UE 2 loses some RTP packets.

Therefore, in the current group communications technology, in a process of switching the UE from unicast to multicast, because the UE repeatedly receives packets or loses some packets, continuous reception of a communication service may be affected. Therefore, how to maintain continuity of the communication service is a problem that currently needs an urgent solution.

SUMMARY

Embodiments of the present disclosure provide a data transmission method and apparatus, so as to avoid a problem that continuity of a communication service may be affected due to repeated reception of packets or a loss of some packets, and maintain the continuity of the communication service.

According to a first aspect, a data transmission method is provided, including: measuring, by user equipment UE, a transmission delay; and sending, by the UE, the transmission delay to a group communication service application server (GCS AS), so that the GCS AS determines, according to the transmission delay, a time of sending a packet on a multicast path or a unicast path.

With reference to the first aspect, in a first possible implementation manner of the first aspect, the measuring, by UE, a transmission delay includes:

using, by the UE, a difference between a unicast transmission delay and a multicast transmission delay as the transmission delay of the packet.

With reference to the first aspect, in a second possible implementation manner of the first aspect, the measuring, by user equipment UE, a transmission delay includes: measuring, by the UE, the transmission delay according to a timestamp identifier of the packet.

With reference to the second possible implementation manner of the first aspect, in a third possible implementation manner, the measuring, by the UE, the transmission delay according to a timestamp identifier of the packet includes: if switching from unicast to multicast is performed, obtaining, by the UE, a first timestamp identifier and a sequence number of a first packet received on the unicast path; or if the UE is switched to multicast, obtaining, by the UE, a second timestamp identifier of a second packet that is received on the multicast path and that has a same sequence number as that of the first packet, where the transmission delay measured by the UE is a difference between the second timestamp identifier and the first timestamp identifier.

With reference to the second possible implementation manner of the first aspect, in a fourth possible implementation manner, the measuring, by the UE, the transmission delay according to a timestamp identifier of the packet includes: if switching from multicast to unicast is performed, obtaining, by the UE, a third timestamp identifier and a sequence number of a third packet received on the multicast path; or if the UE is switched to unicast, obtaining, by the UE, a fourth timestamp identifier of a fourth packet that is received on the unicast path and that has a same sequence number as that of the third packet, where the transmission delay measured by the UE is a difference between the fourth timestamp identifier and the third timestamp identifier.

With reference to the first aspect, in a fifth possible implementation manner, the measuring, by user equipment, a transmission delay includes: measuring, by the UE, the transmission delay according to a sequence number of the packet.

With reference to the fifth possible implementation manner of the first aspect, in a sixth possible implementation manner, the measuring, by the UE, the transmission delay according to a sequence number of the packet includes: during switching, obtaining, by the UE, a first sequence number of a first packet received on the unicast path, and obtaining, by the UE, a second sequence number of a second packet received on the multicast path, where the transmission delay measured by the UE is a product of a difference between the first sequence number and the second sequence number and a packet scheduling period.

With reference to any one of the first aspect or the first to the sixth possible implementation manners of the first aspect, in a seventh possible implementation manner, the sending, by the UE, the transmission delay to a group communication service application server (GCS AS) includes: sending, by the UE, the transmission delay to the GCS AS by using a quality of experience reporting QoE reporting procedure, a Session Initiation Protocol (SIP) procedure, or a Real-Time Transport Protocol (RTCP) procedure.

According to a second aspect, a data transmission method is provided, including: when switching between unicast and multicast is performed, obtaining, by user equipment UE, a first timestamp identifier and a sequence number of a first packet on a first path; after switching, obtaining, by the UE, a second timestamp identifier of a second packet that is on a second path and that has a same sequence number as that of the first packet; and sending, by the UE, the first timestamp identifier and the second timestamp identifier to a group communication service application server (GCS AS), so that the GCS AS determines, according to the first timestamp identifier and the second timestamp identifier, a time of sending a packet on a multicast path or a unicast path.

With reference to the second aspect, in a first possible implementation manner, the switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

According to a third aspect, a data transmission method is provided, including: when switching between unicast and multicast is performed, obtaining, by user equipment UE, a first sequence number of a first packet on a first path, and obtaining a second sequence number of a second packet on a second path; and sending, by the UE, the first sequence number and the second sequence number to a group communication service application server GCS AS, so that the GCS AS determines, according to the first sequence number and the second sequence number, a time of sending a packet on a multicast path or a unicast path.

With reference to the third aspect, in a first possible implementation manner, the switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

According to a fourth aspect, a data transmission method is provided, including: determining, by a group communication service application server (GCS AS), a transmission delay; and determining, by the GCS AS according to the transmission delay, a time of sending a packet on a multicast path or a unicast path.

With reference to the fourth aspect, in a first possible implementation manner, the determining, by a group communication service application server (GCS AS), a transmission delay includes: receiving, by the GCS AS, a transmission delay sent by UE.

With reference to the fourth aspect, in a second possible implementation manner, the determining, by a GCS AS, a transmission delay includes: receiving, by the GCS AS, a first timestamp identifier and a second timestamp identifier that are sent by first UE, where the first timestamp identifier is a first timestamp identifier of a first packet obtained by the UE on a first path when switching between unicast and multicast is performed, and the second timestamp identifier is a second timestamp identifier of a second packet that is obtained by the UE on a second path after switching and that has a same sequence number as that of the first packet; and measuring, by the GCS AS, a transmission delay of the first UE according to a difference between the first timestamp identifier and the second timestamp identifier.

With reference to the fourth aspect, in a third possible implementation manner, the determining, by a GCS AS, a transmission delay includes: receiving, by the GCS AS, a first sequence number and a second sequence number that are sent by first UE, where the first sequence number is a first sequence number of a first packet obtained by the first UE on a first path when switching between unicast and multicast is performed, and the second sequence number is a second sequence number of a second packet obtained by the first UE on a second path; and measuring, by the GCS AS, a transmission delay of the first UE according to a product of a difference between the first sequence number and the second sequence number and a packet scheduling period.

With reference to the third possible implementation manner of the fourth aspect, in a fourth possible implementation manner, the switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path. With reference to any one of the fourth aspect or the first to the third possible implementation manners of the fourth aspect, in a fifth possible implementation manner, the determining, by the GCS AS according to the transmission delay, a time of sending a packet on a multicast path or a unicast path includes: sending, by the GCS AS, the packet on the multicast path a first time earlier; or sending, by the GCS AS, the packet on the unicast path a first time later, where the first time is a largest value of transmission delays determined by the GCS AS, or is an average value of transmission delays determined by the GCS AS.

According to a fifth aspect, a data transmission apparatus is provided, including: a processing module, configured to measure a transmission delay; and a sending module, configured to send the transmission delay to a group communication service application server (GCS AS), so that the GCS AS determines, according to the transmission delay, a time of sending a packet on a multicast path or a unicast path.

With reference to the fifth aspect, in a first possible implementation manner, the processing module being configured to measure a transmission delay includes:

the processing module being configured to use a difference between a unicast transmission delay and a multicast transmission delay as the transmission delay of the packet.

With reference to the fifth aspect, in a second possible implementation manner, the processing module being configured to measure a transmission delay includes:

the processing module being configured to measure the transmission delay according to a timestamp identifier of the packet.

With reference to the second possible implementation manner of the fifth aspect, in a third possible implementation manner, the apparatus further includes an obtaining module, where if switching from unicast to multicast is performed, the obtaining module is configured to obtain a first timestamp identifier and a sequence number of a first packet received on the unicast path; or if the apparatus is switched to multicast, the obtaining module is configured to obtain a second timestamp identifier of a second packet that is received on the multicast path and that has a same sequence number as that of the first packet, where the transmission delay measured by the processing module is a difference between the second timestamp identifier and the first timestamp identifier.

With reference to the third possible implementation manner of the fifth aspect, in a fourth possible implementation manner, the apparatus further includes an obtaining module, where if switching from multicast to unicast is performed, the obtaining module is configured to obtain a third timestamp identifier and a sequence number of a third packet received on the multicast path; and if the UE is switched to unicast, the UE obtains a fourth timestamp identifier of a fourth packet that is received on the unicast path and that has a same sequence number as that of the third packet, where the transmission delay measured by the processing module is a difference between the fourth timestamp identifier and the third timestamp identifier.

With reference to the fifth aspect, in a fifth possible implementation manner, the processing module being configured to measure a transmission delay includes: the processing module being configured to measure the transmission delay according to a sequence number of the packet.

With reference to the fifth possible implementation manner of the fifth aspect, in a sixth possible implementation manner, the apparatus further includes an obtaining module, where during switching, the obtaining module is configured to obtain a first sequence number of a first packet received on the unicast path, and configured to obtain a second sequence number of a second packet received on the multicast path, where the transmission delay measured by the processing module is a product of a difference between the first sequence number and the second sequence number and a packet scheduling period.

With reference to any one of the fifth aspect or the first to the sixth possible implementation manners of the fifth aspect, in a seventh possible implementation manner, the sending module being configured to send the transmission delay to a group communication service application server (GCS AS) includes: the sending module being configured to send the transmission delay to the GCS AS by using a quality of experience reporting QoE reporting procedure, a Session Initiation Protocol (SIP) procedure, or a Real-Time Transport Protocol (RTCP) procedure.

According to a sixth aspect, a data transmission apparatus is provided, including: an obtaining module, configured to: when switching between unicast and multicast is performed, obtain a first timestamp identifier and a sequence number of a first packet on a first path; and further configured to: after switching, obtain a second timestamp identifier of a second packet that is on a second path and that has a same sequence number as that of the first packet; and a sending module, configured to send the first timestamp identifier and the second timestamp identifier to a group communication service application server (GCS AS), so that the GCS AS determines, according to the first timestamp identifier and the second timestamp identifier, a time of sending a packet on a multicast path or a unicast path.

With reference to the sixth aspect, in a first possible implementation manner, the switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

According to a seventh aspect, a data transmission apparatus is provided, including: an obtaining module, configured to: when switching between unicast and multicast is performed, obtain a first sequence number of a first packet on a first path, and obtain a second sequence number of a second packet on a second path; and a sending module, configured to send the first sequence number and the second sequence number to a group communication service application server (GCS AS), so that the GCS AS determines, according to the first sequence number and the second sequence number, a time of sending a packet on a multicast path or a unicast path.

With reference to the seventh aspect, in a first possible implementation manner, the switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

According to an eighth aspect, a data transmission apparatus is provided, including: a processing module, configured to determine a transmission delay, where the processing module is further configured to determine, according to the transmission delay, a time of sending a packet on a multicast path or a unicast path.

With reference to the eighth aspect, in a first possible implementation manner, the apparatus further includes an obtaining module, where the obtaining module is configured to receive a transmission delay sent by UE, and the transmission delay determined by the processing module is the transmission delay received by the obtaining module.

With reference to the eighth aspect, in a second possible implementation manner, the apparatus further includes an obtaining module, where the obtaining module is configured to receive a first timestamp identifier and a second timestamp identifier that are sent by first UE, where the first timestamp identifier is a first timestamp identifier of a first packet obtained by the UE on a first path when switching between unicast and multicast is performed, and the second timestamp identifier is a second timestamp identifier of a second packet that is obtained by the UE on a second path after switching and that has a same sequence number as that of the first packet; and the processing module being configured to determine a transmission delay includes: the processing module being configured to measure a transmission delay of the first UE according to a difference between the first timestamp identifier and the second timestamp identifier.

With reference to the eighth aspect, in a third possible implementation manner, the apparatus further includes an obtaining module, where the obtaining module is configured to receive a first sequence number and a second sequence number that are sent by first UE, where the first sequence number is a first sequence number of a first packet obtained by the first UE on a first path when switching between unicast and multicast is performed, and the second sequence number is a second sequence number of a second packet obtained by the first UE on a second path; and the processing module being configured to determine a transmission delay includes: the processing module being configured to measure a transmission delay of the first UE according to a product of a difference between the first sequence number and the second sequence number and a packet scheduling period.

With reference to the third possible implementation manner of the eighth aspect, in a fourth possible implementation manner, the switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

With reference to any one of the eighth aspect or the first to the fourth possible implementation manners of the eighth aspect, in a fifth possible implementation manner, the processing module being configured to determine, according to the transmission delay, a time of sending a packet on a multicast path or a unicast path includes: the processing module being configured to send the packet on the multicast path a first time earlier; or the processing module being configured to send the packet on the unicast path a first time later, where the first time is a largest value of transmission delays determined by the processing module, or is an average value of transmission delays determined by the processing module.

Based on the technical solutions provided in the present disclosure, UE measures a transmission delay and transmits the transmission delay to a GCS AS, or a GCS AS itself determines a transmission delay, so that the GCS AS may determine, according to the transmission delay, a time of sending a packet on a multicast path or a unicast path. Therefore, a problem of out of order of packets or a loss of a packet due to a transmission delay is resolved, and continuity of a communication service is maintained.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be understood that, the technical solutions of the embodiments of the present disclosure may be applied to various communications systems, such as: a Global System of Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), and a Worldwide Interoperability for Microwave Access (WiMAX) communications system.

Figure 2:
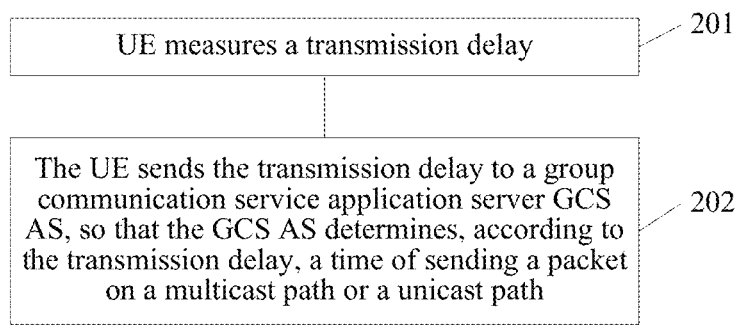
FIG. 2 is a schematic flowchart of a data transmission method according to an embodiment of the present disclosure.

FIG. 2 is a schematic flowchart of a data transmission method according to an embodiment of the present disclosure. The method may be executed by any proper apparatus, for example, executed by UE, but the present disclosure is not limited thereto.

S201: UE measures a transmission delay.

Specifically, the UE uses a difference between a unicast transmission delay and a multicast transmission delay as a transmission delay of a packet.

Currently, the unicast transmission delay is 40 ms, and the multicast transmission delay is 160 ms. The UE uses the difference between the unicast and multicast transmission delays as a transmission delay of the UE, that is, the transmission delay is 120 ms (160 ms minus 40 ms=120 ms).

S202: The UE sends the transmission delay to a group communication service application server (GCS AS), so that the GCS AS determines, according to the transmission delay, a time of sending a packet on a multicast path or a unicast path.

The UE sends the transmission delay to the GCS AS.

Specifically, the UE sends the transmission delay to the GCS AS by using a quality of experience (QoE) reporting procedure, that is, sends a QoE result to a broadcast/multicast service center (BM-SC). The QoE result includes the transmission delay. The BM-SC then sends the transmission delay to the GCS AS. The BM-SC sends the transmission delay to the GCS AS by using an MB2 interface procedure. Specifically, the BM-SC sends the transmission delay to the GCS AS by using an MBMS delivery status indication procedure, or may send the transmission delay by using another procedure. This is not limited in the present disclosure.

Optionally, the UE may send the transmission delay to the GCS AS by using an existing Session Initiation Protocol (SIP) procedure, that is, the UE sends an SIP message to the GCS AS. The SIP message includes the transmission delay.

Optionally, the UE may send the transmission delay to the GCS AS by using an existing Real-Time Transport Control Protocol (RTCP) procedure. The UE may modify parameter information in an RTCP packet, for example, adds a parameter representing the transmission delay to an RTCP packet header, or may use a DLSR parameter in an RTCP packet header to represent the transmission delay.

The GCS AS determines, according to the transmission delay, the time of sending the packet on the multicast path or the unicast path.

Specifically, the GCS AS determines a time value according to multiple different received transmission delays sent by UEs. The time value may be a largest value of the multiple transmission delays or may be an average value of the multiple transmission delays. This is not limited in the present disclosure.

On the multicast path, the GCS AS sends the packet at the determined time value earlier; or on the unicast path, the GCS AS sends the packet at the determined time value later.

That is, if a transmission manner is switched from unicast to multicast, the GCS AS brings forward sending of the packet on the multicast path; or if a transmission manner is switched from multicast to unicast, the GCS AS puts sending of the packet on the unicast path off.

Therefore, based on the technical solutions provided in this embodiment of the present disclosure, UE measures a transmission delay and transmits the transmission delay to a GCS AS, so that the GCS AS may determine, according to the transmission delay, a time of sending a packet on a multicast path or a unicast path. Therefore, a problem of out of order of packets or a loss of a packet due to a transmission delay is resolved, and continuity of a communication service is maintained.

Figure 3:
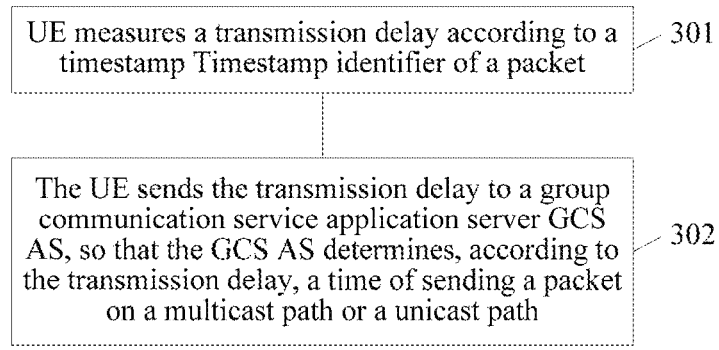
FIG. 3 is a schematic flowchart of a data transmission method according to an embodiment of the present disclosure.

FIG. 3 is a schematic flowchart of a data transmission method according to an embodiment of the present disclosure. The embodiment shown in FIG. 3 is a specific embodiment of the embodiment shown in FIG. 2.

Specifically, S201 includes the following steps.

S301: The UE measures the transmission delay according to a timestamp identifier of the packet.

Specifically, if switching from unicast to multicast is performed, the UE reads a first timestamp identifier (Timestamp 1) and sequence number 1 of a first packet (RTP packet A) received on the unicast path. When the UE is switched to multicast, and the UE records a second packet (RTP packet B) that is received on the multicast path and that has a same sequence number (sequence number 1) as that of RTP packet A, the UE reads a second timestamp identifier (Timestamp 2) of RTP packet B. The UE measures the transmission delay according to a difference between the Timestamps of the packets that are received on the unicast path and the multicast path and that have the same sequence number, that is, the transmission delay=Timestamp 2−Timestamp 1.

Alternatively, if switching from multicast to unicast is performed, the UE reads Timestamp 3 and sequence number 3 of a third packet (RTP packet C) received on the multicast path. When the UE is switched to unicast, and the UE reads a fourth packet (RTP packet D) that is received on the unicast path and that has a same sequence number (sequence number 3) as that of the third packet, the UE reads Timestamp 4 of RTP packet D. The UE measures the transmission delay according to a difference between the Timestamps of the packets that are received on the multicast path and the unicast path and that have the same sequence number, that is, the transmission delay=Timestamp 4-Timestamp 3.

S302: The UE sends the transmission delay to a group communication service application server (GCS AS), so that the GCS AS determines, according to the transmission delay, a time of sending the packet on the multicast path or the unicast path.

Specifically, the GCS AS determines a time value according to multiple different received transmission delays sent by UEs. The time value may be a largest value of the multiple transmission delays or may be an average value of the multiple transmission delays. This is not limited in the present disclosure.

On the multicast path, the GCS AS sends the packet at the determined time value earlier; or on the unicast path, the GCS AS sends the packet at the determined time value later. That is, if a transmission manner is switched from unicast to multicast, the GCS AS brings forward sending of the packet on the multicast path; or if a transmission manner is switched from multicast to unicast, the GCS AS puts sending of the packet on the unicast path off.

Therefore, based on the technical solutions provided in this embodiment of the present disclosure, UE measures a transmission delay according to a timestamp identifier of a packet and transmits the transmission delay to a GCS AS, so that the GCS AS may determine, according to the transmission delay, a time of sending a packet on a multicast path or a unicast path. Therefore, a problem of out of order of packets or a loss of a packet due to a transmission delay is resolved, and continuity of a communication service is maintained.

In another embodiment of the present disclosure, the UE reads the first timestamp identifier Timestamp 1 of the first packet (RTP packet A) and the second timestamp identifier Timestamp 2 of the second packet (RTP packet B), and sends the read timestamp identifiers to the GCS AS. The GCS AS measures the transmission delay according to the received timestamp identifiers, and determines, according to the transmission delay, the time of sending the packet on the multicast path or the unicast path.

Specifically, that is, when switching between unicast and multicast is performed, the user equipment UE obtains the first timestamp identifier and the sequence number of the first packet on a first path.

After switching, the UE obtains the second timestamp identifier of the second packet that is on the second path and that has a same sequence number as that of the first packet.

The UE sends the first timestamp identifier and the second timestamp identifier to the group communication service application server (GCS AS), so that the GCS AS determines, according to the first timestamp identifier and the second timestamp identifier, the time of sending the packet on the multicast path or the unicast path.

The switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

For this embodiment, refer to related steps in the embodiment shown in FIG. 3. In this embodiment, the procedure of measuring the transmission delay in the embodiment shown in FIG. 3 is completed by the GCS AS. For this embodiment, refer to the embodiments of the present disclosure that are shown in FIG. 2 and FIG. 3.

Figure 4:
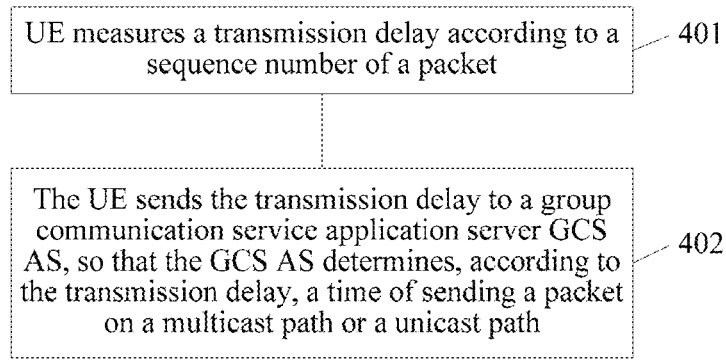
FIG. 4 is a schematic flowchart of a data transmission method according to an embodiment of the present disclosure.

FIG. 4 is a schematic flowchart of a data transmission method according to an embodiment of the present disclosure. The embodiment shown in FIG. 4 is a specific embodiment of the embodiment shown in FIG. 2.

Specifically, S201 includes the following steps.

S401: The UE measures the transmission delay according to a sequence number of the packet.

The UE calculates the transmission delay according to a sequence number in an RTP packet header.

Figure 1:
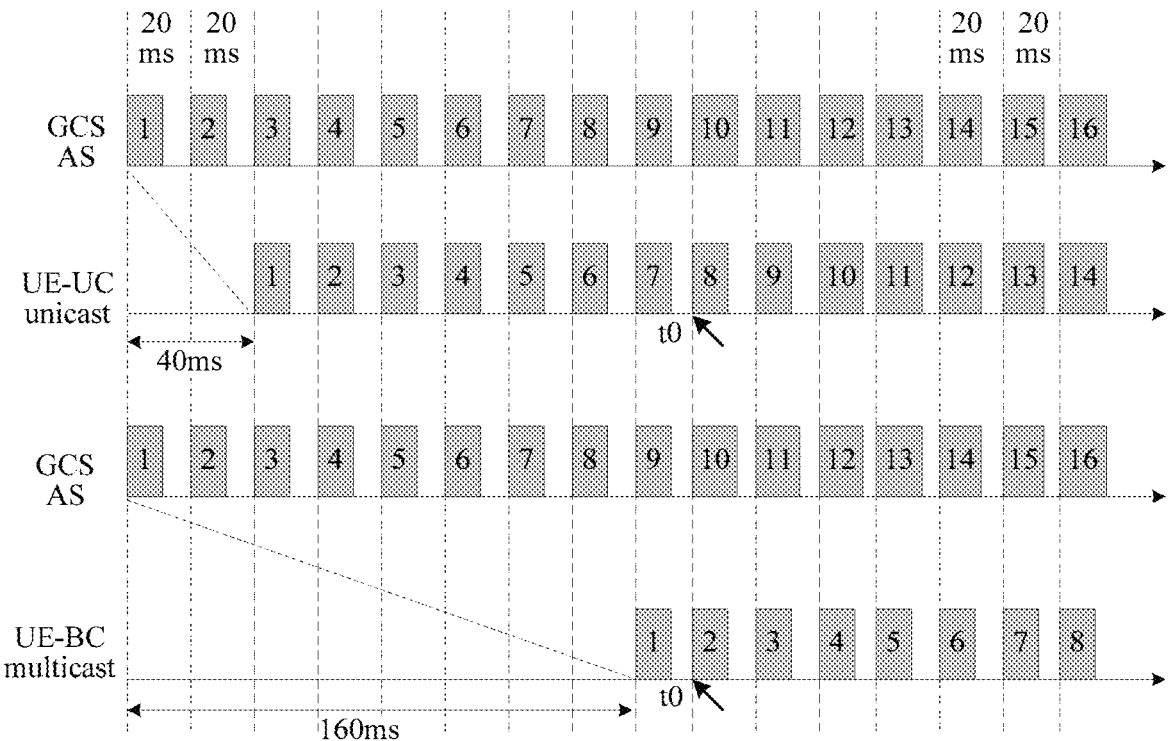
FIG. 1 is a schematic diagram of a transmission delay when UE is switched.

At a switching moment (for example, a moment t0 in FIG. 1), the UE obtains a first sequence number (sequence number c) of a first packet (RTP packet C) received on the unicast path. The UE obtains a second sequence number (sequence number d) of a second packet (RTP packet D) received on the multicast path. The transmission delay measured by the UE is a product of a difference between the sequence numbers (a difference between sequence number c and sequence number d) and a packet scheduling period, that is, a product of a scheduling period 20 ms of the RTP protocol.

S402: The UE sends the transmission delay to a group communication service application server GCS AS, so that the GCS AS determines, according to the transmission delay, a time of sending the packet on the multicast path or the unicast path.

Specifically, the GCS AS determines a time value according to multiple different received transmission delays sent by UEs. The time value may be a largest value of the multiple transmission delays or may be an average value of the multiple transmission delays. This is not limited in the present disclosure.

On the multicast path, the GCS AS sends the packet at the determined time value earlier; or on the unicast path, the GCS AS sends the packet at the determined time value later. That is, if a transmission manner is switched from unicast to multicast, the GCS AS brings forward sending of the packet on the multicast path; or if a transmission manner is switched from multicast to unicast, the GCS AS puts sending of the packet on the unicast path off.

Therefore, based on the technical solutions provided in this embodiment of the present disclosure, UE measures a transmission delay according to a sequence number of a packet and transmits the transmission delay to a GCS AS, so that the GCS AS may determine, according to the transmission delay, a time of sending the packet on a multicast path or a unicast path. Therefore, a problem of out of order of packets or a loss of a packet due to the transmission delay is resolved, and continuity of a communication service is maintained.

In another embodiment of the present disclosure, when switching between unicast and multicast is performed, the user equipment UE obtains the first sequence number of the first packet on the first path, and obtains a second sequence number of the second packet on the second path.

The UE sends the first sequence number and the second sequence number to the group communication service application server GCS AS, so that the GCS AS determines, according to the first sequence number and the second sequence number, the time of sending the packet on the multicast path or the unicast path.

The switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

For example, the UE obtains the first sequence number (sequence number c) of the first packet (RTP packet C) that is received on the first path (unicast path) and the second sequence number (sequence number d) of the second packet (RTP packet D) that is received on the second path (multicast path), and sends the obtained sequence numbers of the packets to the GCS AS. The GCS AS calculates the transmission delay according to the received sequence numbers, and determines, according to the delay, the time of sending the packet on the multicast path or the unicast path. That is, the GCS AS sends the packet on the multicast path at the determined time value earlier; or the GCS AS sends the packet on the unicast path at the determined time value later.

For this embodiment, refer to related steps in the embodiment shown in FIG. 4. In this embodiment, the procedure of measuring the transmission delay in the embodiment shown in FIG. 4 is completed by the GCS AS. For this embodiment, refer to the embodiments of the present disclosure that are shown in FIG. 2 and FIG. 4.

Figure 5:
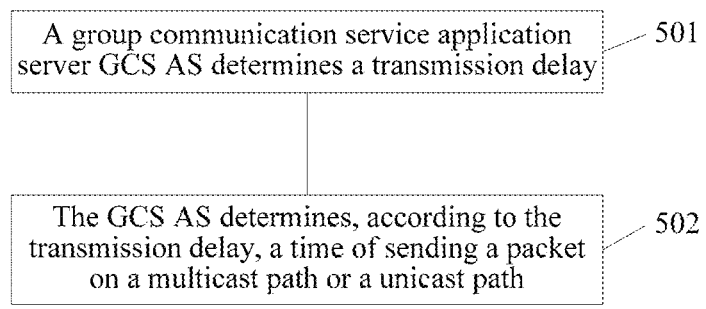
FIG. 5 is a schematic flowchart of a data transmission method according to an embodiment of the present disclosure.

FIG. 5 is a schematic flowchart of a data transmission method according to an embodiment of the present disclosure. The method may be executed by any proper apparatus, for example, executed by a GCS AS, but the present disclosure is not limited thereto. The embodiment of the present disclosure shown in FIG. 5 and other embodiments of the present disclosure may be cross-referenced.

S501: A group communication service application server GCS AS determines a transmission delay.

Specifically, the GCS AS receives a transmission delay sent by UE.

Optionally, the GCS AS receives a first timestamp identifier and a second timestamp identifier that are sent by first UE. The first timestamp identifier is a first timestamp identifier of a first packet obtained by the UE on a first path when switching between unicast and multicast is performed, and the second timestamp identifier is a second timestamp identifier of a second packet that is obtained by the UE on a second path after switching and that has a same sequence number as that of the first packet. The GCS AS measures a transmission delay of the first UE according to a difference between the first timestamp identifier and the second timestamp identifier.

Optionally, the GCS AS receives a first sequence number and a second sequence number that are sent by first UE. The first sequence number is a first sequence number of a first packet obtained by the first UE on a first path when switching between unicast and multicast is performed, and the second sequence number is a second sequence number of a second packet obtained by the first UE on a second path. The GCS AS measures a transmission delay of the first UE according to a product of a difference between the first sequence number and the second sequence number and a packet scheduling period.

Specifically, the switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

S502: The GCS AS determines, according to the transmission delay, a time of sending a packet on a multicast path or a unicast path.

The GCS AS sends the packet on the multicast path a first time earlier; or the GCS AS sends the packet on the unicast path a first time later. The first time is a largest value of transmission delays determined by the GCS AS, or is an average value of transmission delays determined by the GCS AS.

Specifically, the GCS AS determines a time value according to multiple different received transmission delays sent by UEs or according to multiple different determined transmission delays. The time value may be a largest value of the multiple transmission delays or may be an average value of the multiple transmission delays. This is not limited in the present disclosure.

On the multicast path, the GCS AS sends the packet at the determined time value earlier; or on the unicast path, the GCS AS sends the packet at the determined time value later.

That is, if a transmission manner is switched from unicast to multicast, the GCS AS brings forward sending of the packet on the multicast path; or if a transmission manner is switched from multicast to unicast, the GCS AS puts sending of the packet on the unicast path off.

Therefore, based on the technical solutions provided in this embodiment of the present disclosure, after determining a transmission delay, a GCS AS may determine, according to the transmission delay, a time of sending a packet on a multicast path or a unicast path. Therefore, a problem of out of order of packets or a loss of a packet due to the transmission delay is resolved, and continuity of a communication service is maintained.

Figure 6:
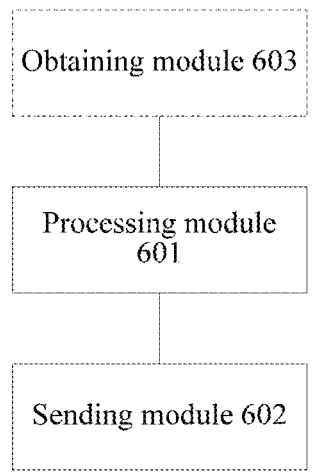
FIG. 6 is a schematic block diagram of a data transmission apparatus according to an embodiment of the present disclosure.

FIG. 6 is a schematic block diagram of a data transmission apparatus according to an embodiment of the present disclosure. The apparatus may be UE, but the present disclosure is not limited thereto. The apparatus may be configured to implement the methods in the embodiments of the present disclosure that are shown in FIG. 2 to FIG. 4.

As shown in FIG. 6, the apparatus includes: a processing module 601 and a sending module 602.

The processing module 601 is configured to measure a transmission delay.

Specifically, the processing module 601 is configured to use a difference between a unicast transmission delay and a multicast transmission delay as the transmission delay of a packet.

Alternatively, the processing module 601 is configured to measure the transmission delay according to a timestamp identifier of a packet.

The apparatus further includes an obtaining module 603. If switching from unicast to multicast is performed, the obtaining module 603 is configured to obtain a first timestamp identifier and a sequence number of a first packet received on a unicast path; or if the apparatus is switched to multicast, the obtaining module 603 is configured to obtain a second timestamp identifier of a second packet that is received on a multicast path and that has a same sequence number as that of the first packet. The transmission delay measured by the processing module 601 is a difference between the second timestamp identifier and the first timestamp identifier.

Alternatively, if switching from multicast to unicast is performed, the obtaining module 603 is configured to obtain a third timestamp identifier and a sequence number of a third packet received on a multicast path; and if the UE is switched to unicast, the UE obtains a fourth timestamp identifier of a fourth packet that is received on a unicast path and that has a same sequence number as that of the third packet. The transmission delay measured by the processing module 601 is a difference between the fourth timestamp identifier and the third timestamp identifier.

Optionally, the processing module 601 is configured to measure the transmission delay according to a sequence number of the packet. During switching, the obtaining module is configured to obtain a first sequence number of a first packet received on the unicast path, and configured to obtain a second sequence number of a second packet received on the multicast path. The transmission delay measured by the processing module 601 is a product of a difference between the first sequence number and the second sequence number and a packet scheduling period.

The sending module 602 is configured to send the transmission delay to a group communication service application server GCS AS, so that the GCS AS determines, according to the transmission delay, a time of sending the packet on the multicast path or the unicast path.

Specifically, the sending module 602 is configured to send the transmission delay to the GCS AS by using a quality of experience reporting QoE reporting procedure, a Session Initiation Protocol (SIP) procedure, or a Real-Time Transport Protocol (RTCP) procedure.

Therefore, based on the apparatus provided in this embodiment of the present disclosure, the apparatus measures a transmission delay and transmits the transmission delay to a GCS AS, so that the GCS AS may determine, according to the transmission delay, a time of sending a packet on a multicast path or a unicast path. Therefore, a problem of out of order of packets or a loss of a packet due to the transmission delay is resolved, and continuity of a communication service is maintained.

The apparatus provided in this embodiment of the present disclosure and other embodiments of the present disclosure may be cross-referenced. Details are not described in the present disclosure herein again.

Figure 7:
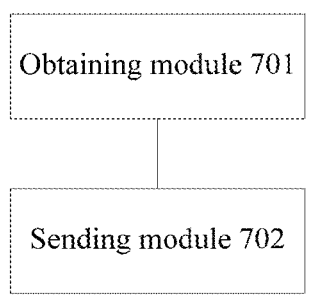
FIG. 7 is a schematic block diagram of a data transmission apparatus according to an embodiment of the present disclosure.

FIG. 7 is a schematic block diagram of a data transmission apparatus according to an embodiment of the present disclosure. The apparatus may be UE, but the present disclosure is not limited thereto.

As shown in FIG. 7, the apparatus includes:

an obtaining module 701, configured to: when switching between unicast and multicast is performed, obtain a first timestamp identifier and a sequence number of a first packet on a first path; and further configured to: after switching, obtain a second timestamp identifier of a second packet that is on a second path and that has a same sequence number as that of the first packet; and a sending module 702, configured to send the first timestamp identifier and the second timestamp identifier to a group communication service application server (GCS AS), so that the GCS AS determines, according to the first timestamp identifier and the second timestamp identifier, a time of sending a packet on a multicast path or a unicast path.

The switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

Therefore, based on the apparatus provided in this embodiment of the present disclosure, a timestamp identifier of a packet is sent to a GCS AS, so that the GCS AS determines, according to the first timestamp identifier and the second timestamp identifier, a time of sending the packet on a multicast path or a unicast path. Therefore, a problem of out of order of packets or a loss of a packet due to the transmission delay is resolved, and continuity of a communication service is maintained.

The apparatus provided in this embodiment of the present disclosure and others embodiment of the present disclosure may be cross-referenced. Details are not described in the present disclosure herein again.

Figure 8:
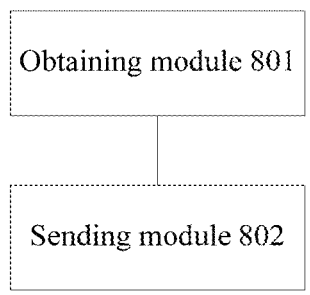
FIG. 8 is a schematic block diagram of a data transmission apparatus according to an embodiment of the present disclosure.

FIG. 8 is a schematic block diagram of a data transmission apparatus according to an embodiment of the present disclosure. The apparatus may be UE, but the present disclosure is not limited thereto.

As shown in FIG. 8, the apparatus includes:

an obtaining module 801, configured to: when switching between unicast and multicast is performed, obtain a first sequence number of a first packet on a first path, and obtain a second sequence number of a second packet on a second path; and a sending module 802, configured to send the first sequence number and the second sequence number to a group communication service application server (GCS AS), so that the GCS AS determines, according to the first sequence number and the second sequence number, a time of sending a packet on a multicast path or a unicast path.

The switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

Therefore, based on the apparatus provided in this embodiment of the present disclosure, a sequence number of a packet is sent to a GCS AS, so that the GCS AS determines, according to the first sequence number and the second sequence number, a time of sending the packet on a multicast path or a unicast path. Therefore, a problem of out of order of packets or a loss of a packet due to the transmission delay is resolved, and continuity of a communication service is maintained.

The apparatus provided in this embodiment of the present disclosure and others embodiment of the present disclosure may be cross-referenced. Details are not described in the present disclosure herein again.

Figure 9:
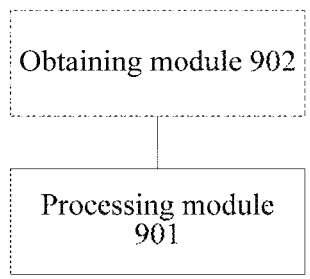
FIG. 9 is a schematic block diagram of a data transmission apparatus according to an embodiment of the present disclosure.

FIG. 9 is a schematic block diagram of a data transmission apparatus according to an embodiment of the present disclosure. The apparatus may be a GCS AS, but the present disclosure is not limited thereto. The apparatus may be configured to implement the methods in the embodiments of the present disclosure that are shown in FIG. 2 to FIG. 5.

As shown in FIG. 9, the apparatus includes:

a processing module 901, configured to determine a transmission delay, and further configured to determine, according to the transmission delay, a time of sending a packet on a multicast path or a unicast path.

The apparatus further includes an obtaining module 902. The obtaining module 902 is configured to receive a transmission delay sent by UE, and the transmission delay determined by the processing module 901 is the transmission delay received by the obtaining module.

Alternatively, the obtaining module 902 is configured to receive a first timestamp identifier and a second timestamp identifier that are sent by first UE. The first timestamp identifier is a first timestamp identifier of a first packet obtained by the UE on a first path when switching between unicast and multicast is performed, and the second timestamp identifier is a second timestamp identifier of a second packet that is obtained by the UE on a second path after switching and that has a same sequence number as that of the first packet. The processing module 901 is configured to measure a transmission delay of the first UE according to a difference between the first timestamp identifier and the second timestamp identifier.

Optionally, the obtaining module 902 is configured to receive a first sequence number and a second sequence number that are sent by first UE. The first sequence number is a first sequence number of a first packet obtained by the first UE on a first path when switching between unicast and multicast is performed, and the second sequence number is a second sequence number of a second packet obtained by the first UE on a second path. The processing module 901 is configured to measure a transmission delay of the first UE according to a product of a difference between the first sequence number and the second sequence number and a packet scheduling period.

Specifically, the switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

The processing module 901 being configured to determine, according to the transmission delay, a time of sending a packet on a multicast path or a unicast path includes: the processing module 901 being configured to send the packet on the multicast path a first time earlier; or the processing module 901 being configured to send the packet on the unicast path a first time later. The first time is a largest value of transmission delays determined by the processing module, or is an average value of transmission delays determined by the processing module.

Therefore, based on the apparatus provided in this embodiment of the present disclosure, after a transmission delay is determined, a time of sending a packet on a multicast path or a unicast path may be determined according to the transmission delay. Therefore, a problem of out of order of packets or a loss of a packet due to the transmission delay is resolved, and continuity of a communication service is maintained.

The apparatus provided in this embodiment of the present disclosure and others embodiment of the present disclosure may be cross-referenced. Details are not described in the present disclosure herein again.

Figure 10:
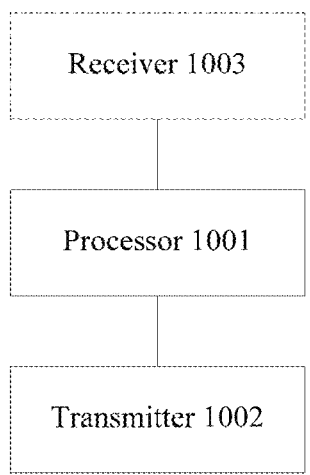
FIG. 10 is a schematic block diagram of a data transmission apparatus according to an embodiment of the present disclosure.

FIG. 10 is a schematic block diagram of a data transmission apparatus according to an embodiment of the present disclosure. The apparatus may be UE, but the present disclosure is not limited thereto. The apparatus may be configured to implement the methods in the embodiments of the present disclosure that are shown in FIG. 2 to FIG. 4.

As shown in FIG. 10, the apparatus includes: a processor 1001 and a transmitter 1002.

The processor 1001 is configured to measure a transmission delay.

Specifically, the processor 1001 is configured to use a difference between a unicast transmission delay and a multicast transmission delay as the transmission delay of a packet.

Alternatively, the processor 1001 is configured to measure the transmission delay according to a timestamp identifier of a packet.

The apparatus further includes a receiver 1003. If switching from unicast to multicast is performed, the receiver 1003 is configured to obtain a first timestamp identifier and a sequence number of a first packet received on a unicast path; or if the apparatus is switched to multicast, the receiver 1003 is configured to obtain a second timestamp identifier of a second packet that is received on a multicast path and that has a same sequence number as that of the first packet. The transmission delay measured by the processor 1001 is a difference between the second timestamp identifier and the first timestamp identifier.

Alternatively, if switching from multicast to unicast is performed, the receiver 1003 is configured to obtain a third timestamp identifier and a sequence number of a third packet received on a multicast path; and if the UE is switched to unicast, the UE obtains a fourth timestamp identifier of a fourth packet that is received on a unicast path and that has a same sequence number as that of the third packet. The transmission delay measured by the processor 1001 is a difference between the fourth timestamp identifier and the third timestamp identifier.

Optionally, the processor 1001 is configured to measure the transmission delay according to a sequence number of the packet. During switching, the obtaining module is configured to obtain a first sequence number of a first packet received on the unicast path, and configured to obtain a second sequence number of a second packet received on the multicast path. The transmission delay measured by the processor 1001 is a product of a difference between the first sequence number and the second sequence number and a packet scheduling period.

The transmitter 1002 is configured to send the transmission delay to a group communication service application server (GCS AS), so that the GCS AS determines, according to the transmission delay, a time of sending the packet on the multicast path or the unicast path.

Specifically, the transmitter 1002 is configured to send the transmission delay to the GCS AS by using a quality of experience (QoE) reporting procedure, a Session Initiation Protocol (SIP) procedure, or a Real-Time Transport Protocol (RTCP) procedure.

Therefore, based on the apparatus provided in this embodiment of the present disclosure, the apparatus measures a transmission delay and transmits the transmission delay to a GCS AS, so that the GCS AS may determine, according to the transmission delay, a time of sending a packet on a multicast path or a unicast path. Therefore, a problem of out of order of packets or a loss of a packet due to the transmission delay is resolved, and continuity of a communication service is maintained.

The apparatus provided in this embodiment of the present disclosure and other embodiments of the present disclosure may be cross-referenced. Details are not described in the present disclosure herein again.

Figure 11:
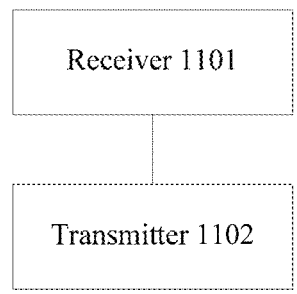
FIG. 11 is a schematic block diagram of a data transmission apparatus according to an embodiment of the present disclosure.

FIG. 11 is a schematic block diagram of a data transmission apparatus according to an embodiment of the present disclosure. The apparatus may be UE, but the present disclosure is not limited thereto.

As shown in FIG. 11, the apparatus includes:

a receiver 1101, configured to: when switching between unicast and multicast is performed, obtain a first timestamp identifier and a sequence number of a first packet on a first path; and further configured to: after switching, obtain a second timestamp identifier of a second packet that is on a second path and that has a same sequence number as that of the first packet; and a transmitter 1102, configured to send the first timestamp identifier and the second timestamp identifier to a group communication service application server (GCS AS), so that the GCS AS determines, according to the first timestamp identifier and the second timestamp identifier, a time of sending a packet on a multicast path or a unicast path.

The switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

Therefore, based on the apparatus provided in this embodiment of the present disclosure, a timestamp identifier of a packet is sent to a GCS AS, so that the GCS AS determines, according to the first timestamp identifier and the second timestamp identifier, a time of sending the packet on a multicast path or a unicast path. Therefore, a problem of out of order of packets or a loss of a packet due to the transmission delay is resolved, and continuity of a communication service is maintained.

The apparatus provided in this embodiment of the present disclosure and others embodiment of the present disclosure may be cross-referenced. Details are not described in the present disclosure herein again.

Figure 12:
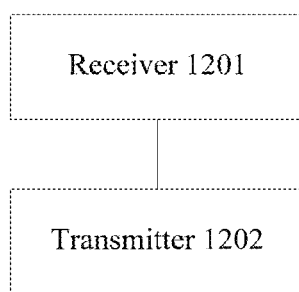
FIG. 12 is a schematic block diagram of a data transmission apparatus according to an embodiment of the present disclosure.

FIG. 12 is a schematic block diagram of a data transmission apparatus according to an embodiment of the present disclosure. The apparatus may be UE, but the present disclosure is not limited thereto.

As shown in FIG. 12, the apparatus includes:

a receiver 1201, configured to: when switching between unicast and multicast is performed, obtain a first sequence number of a first packet on a first path, and obtain a second sequence number of a second packet on a second path; and a transmitter 1202, configured to send the first sequence number and the second sequence number to a group communication service application server (GCS AS), so that the GCS AS determines, according to the first sequence number and the second sequence number, a time of sending a packet on a multicast path or a unicast path.

The switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

Therefore, based on the apparatus provided in this embodiment of the present disclosure, a sequence number of a packet is sent to a GCS AS, so that the GCS AS determines, according to the first sequence number and the second sequence number, a time of sending the packet on a multicast path or a unicast path. Therefore, a problem of out of order of packets or a loss of a packet due to the transmission delay is resolved, and continuity of a communication service is maintained.

The apparatus provided in this embodiment of the present disclosure and others embodiment of the present disclosure may be cross-referenced. Details are not described in the present disclosure herein.

Figure 13:
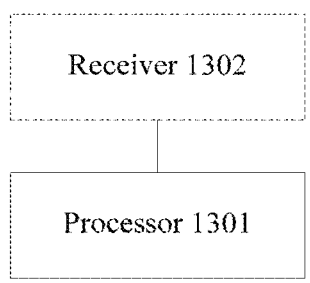
FIG. 13 is a schematic block diagram of a data transmission apparatus according to an embodiment of the present disclosure.

FIG. 13 is a schematic block diagram of a data transmission apparatus according to an embodiment of the present disclosure. The apparatus may be a GCS AS, but the present disclosure is not limited thereto. The apparatus may be configured to implement the methods in the embodiments of the present disclosure that are shown in FIG. 2 to FIG. 5.

As shown in FIG. 13, the apparatus includes:

a processor 1301, configured to determine a transmission delay, and further configured to determine, according to the transmission delay, a time of sending a packet on a multicast path or a unicast path.

The apparatus further includes a receiver 1302. The receiver 1302 is configured to receive a transmission delay sent by UE, and the transmission delay determined by the processor 1301 is the transmission delay received by the obtaining module.

Alternatively, the receiver 1302 is configured to receive a first timestamp identifier and a second timestamp identifier that are sent by first UE. The first timestamp identifier is a first timestamp identifier of a first packet obtained by the UE on a first path when switching between unicast and multicast is performed, and the second timestamp identifier is a second timestamp identifier of a second packet that is obtained by the UE on a second path after switching and that has a same sequence number as that of the first packet. The processor 1301 is configured to measure a transmission delay of the first UE according to a difference between the first timestamp identifier and the second timestamp identifier.

Optionally, the receiver 1302 is configured to receive a first sequence number and a second sequence number that are sent by first UE. The first sequence number is a first sequence number of a first packet obtained by the first UE on a first path when switching between unicast and multicast is performed, and the second sequence number is a second sequence number of a second packet obtained by the first UE on a second path. The processor 1301 is configured to measure a transmission delay of the first UE according to a product of a difference between the first sequence number and the second sequence number and a packet scheduling period.

Specifically, the switching between unicast and multicast includes: when switching from unicast to multicast is performed, the first path is the unicast path, and the second path is the multicast path; or the switching between unicast and multicast includes: when switching from multicast to unicast is performed, the first path is the multicast path, and the second path is the unicast path.

The processor 1301 being configured to determine, according to the transmission delay, a time of sending a packet on a multicast path or a unicast path includes: the processor 1301 being configured to send the packet on the multicast path a first time earlier; or the processor 1301 being configured to send the packet on the unicast path a first time later. The first time is a largest value of transmission delays determined by the processing module, or is an average value of transmission delays determined by the processing module.

Therefore, based on the apparatus provided in this embodiment of the present disclosure, after a transmission delay is determined, a time of sending a packet on a multicast path or a unicast path may be determined according to the transmission delay. Therefore, a problem of out of order of packets or a loss of a packet due to the transmission delay is resolved, and continuity of a communication service is maintained.

The apparatus provided in this embodiment of the present disclosure and others embodiment of the present disclosure may be cross-referenced. Details are not described in the present disclosure herein again.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data transmission method, comprising:
    measuring, by user equipment (UE), a transmission delay, wherein the transmission delay is a difference between a unicast transmission delay and a multicast transmission delay; and
    sending, by the UE, the transmission delay to a group communication service application server (GCS AS), for determining, according to an average value of the transmission delay and transmission delays sent by multiple other UEs, a time of sending a packet on a multicast path or a unicast path, wherein the time of sending the packet on the multicast path is advanced according to the transmission delay, or the time of sending the packet on the unicast path is delayed according to the transmission delay.

2. The method according to claim 1, wherein measuring, by the UE, a transmission delay comprises:
    measuring, by the UE, the transmission delay according to timestamp identifiers of at least one packet received on the multicast path and at least one packet received on the unicast path.

3. The method according to claim 2, wherein measuring, by the UE, the transmission delay comprises:
    before switching from unicast to multicast is performed, obtaining, by the UE, a first timestamp identifier and a sequence number of a first packet received on the unicast path; and
    after the UE is switched to multicast, obtaining, by the UE, a second timestamp identifier of a second packet that is received on the multicast path and that has a same sequence number as that of the first packet, wherein
    the transmission delay measured by the UE is a difference between the second timestamp identifier and the first timestamp identifier.

4. The method according to claim 2, wherein measuring, by the UE, the transmission delay comprises:
    before switching from multicast to unicast is performed, obtaining, by the UE, a third timestamp identifier and a sequence number of a third packet received on the multicast path; and
    after the UE is switched to unicast, obtaining, by the UE, a fourth timestamp identifier of a fourth packet that is received on the unicast path and that has a same sequence number as that of the third packet, wherein
    the transmission delay measured by the UE is a difference between the fourth timestamp identifier and the third timestamp identifier.

5. A data transmission apparatus, comprising:
    a processor configured to measure a transmission delay, wherein the transmission delay is a difference between a unicast transmission delay and a multicast transmission delay; and
    a transmitter configured to send the transmission delay to a group communication service application server (GCS AS), for determining, according to an average value of the transmission delay and transmission delays sent by multiple other data transmission apparatuses, a time of sending a packet on a multicast path or a unicast path, wherein the time of sending the packet on the multicast path is advanced according to the transmission delay, or the time of sending the packet on the unicast path is delayed according to the transmission delay.

6. The apparatus according to claim 5, wherein the processor is further configured to:
    measure the transmission delay according to a timestamp identifiers of at least one packet received on the multicast path and at least one packet received on the unicast path.

7. The method according to claim 1, wherein the UE sends the transmission delay to the GCS AS using a quality of experience (QoE) reporting procedure.

8. The method according to claim 1, wherein the UE sends the transmission delay to the GCS AS by sending a quality of experience (QoE) result to a broadcast/multicast service center (BM-SC), wherein the QoE result includes the transmission delay and the BM-SC then sends the transmission delay to the GCS AS.

9. The method according to claim 1, wherein the UE sends the transmission delay to the GCS AS using a Session Initiation Protocol (SIP) procedure, wherein the UE sends an SIP message to the GCS AS and the SIP message includes the transmission delay.

10. The method according to claim 1, wherein the UE sends the transmission delay to the GCS AS using a Real-Time Transport Control Protocol (RTCP) procedure by modifying parameter information in an RTCP packet to include a parameter representing the transmission delay in an RTCP packet header.

\* \* \* \* \*